United States Patent
Nakashima

(10) Patent No.: US 12,247,938 B2
(45) Date of Patent: Mar. 11, 2025

(54) INSPECTION DEVICE AND MANUFACTURING METHOD OF FILM-TYPE BATTERY

(71) Applicant: Prime Planet Energy & Solutions, Inc., Tokyo (JP)

(72) Inventor: Satoshi Nakashima, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 606 days.

(21) Appl. No.: 17/561,878

(22) Filed: Dec. 24, 2021

(65) Prior Publication Data
US 2022/0205939 A1 Jun. 30, 2022

(30) Foreign Application Priority Data
Dec. 28, 2020 (JP) .................. 2020-218814

(51) Int. Cl.
*G01N 25/72* (2006.01)
*G01B 11/06* (2006.01)
(Continued)

(52) U.S. Cl.
CPC ............. *G01N 25/72* (2013.01); *G01B 11/06* (2013.01); *H01M 10/0436* (2013.01); *G01K 1/12* (2013.01); *H01M 50/183* (2021.01)

(58) Field of Classification Search
CPC ... G01N 25/72; G01B 11/06; H01M 10/0436; H01M 50/183; G01K 1/12
See application file for complete search history.

(56) References Cited

U.S. PATENT DOCUMENTS 5,273,911 A * 12/1993 Sasaki .................. C23C 16/545
  136/258
8,251,576 B1 * 8/2012 Hardikar ................ H02S 50/10
  374/57

(Continued)

FOREIGN PATENT DOCUMENTS

CA       2860468 A1 *  7/2013  .......... H01M 10/617
CN    101806569 A  *  8/2010
(Continued)

OTHER PUBLICATIONS

U.S. Appl. No. 17/561,878, filed Jul. 17, 2024_JP_2015065178_A_H.pdf Apr. 9, 2015.*
(Continued)

*Primary Examiner* — Gail Kaplan Verbitsky
(74) *Attorney, Agent, or Firm* — HAUPTMAN HAM, LLP

(57) ABSTRACT

An inspection device of a film-type battery is provided which can detect a poorly sealed site of a heat seal part. The present disclosure provides an inspection device of a film-type battery including an electrode body, and a film exterior body for accommodating the electrode body in the inside thereof, and having a heat seal part at the periphery thereof. The inspection device includes a temperature measuring device for measuring the temperature distribution of the heat seal part, and a first determination part for controlling the temperature measuring device in a prescribed time after forming the heat seal part at the film exterior body, and determining the presence or absence of a poorly sealed site based on the temperature distribution measured.

5 Claims, 3 Drawing Sheets

(51) Int. Cl.
G01K 1/12 (2006.01)
H01M 10/04 (2006.01)
H01M 50/183 (2021.01)

(56) References Cited

U.S. PATENT DOCUMENTS

| | | | | |
|---|---|---|---|---|
| 2006/0049352 | A1* | 3/2006 | Irani | G01J 5/08 250/339.02 |
| 2007/0299628 | A1* | 12/2007 | Sun | G01B 21/085 702/170 |
| 2011/0148432 | A1* | 6/2011 | Apfelthaler | H01L 31/02005 324/551 |
| 2013/0019942 | A1* | 1/2013 | Tachibana | H01L 31/0463 257/E31.124 |
| 2013/0141571 | A1 | 6/2013 | Yasooka et al. | |
| 2014/0373339 | A1* | 12/2014 | Mori | G01R 31/26 324/426 |
| 2016/0197318 | A1* | 7/2016 | Yamashita | H01M 50/193 429/185 |

FOREIGN PATENT DOCUMENTS

| | | | | | |
|---|---|---|---|---|---|
| CN | 102637769 | A | * | 8/2012 | |
| CN | 105529501 | A | * | 4/2016 | |
| CN | 109477817 | A | * | 3/2019 | B29C 65/02 |
| CN | 111007408 | A | * | 4/2020 | |
| CN | 116989720 | A | * | 11/2023 | |
| JP | H05182649 | A | * | 7/1993 | |
| JP | H0837317 | A | * | 2/1996 | |
| JP | H08106885 | A | * | 4/1996 | |
| JP | 2002225929 | A | | 8/2002 | |
| JP | 2004014791 | A | * | 1/2004 | H01L 31/048 |
| JP | 2005108801 | A | * | 4/2005 | G01N 29/11 |
| JP | 2006242820 | A | | 9/2006 | |
| JP | 200722651 | A | | 2/2007 | |
| JP | 2007022651 | A | * | 2/2007 | |
| JP | 2008153119 | A | * | 7/2008 | |
| JP | 201097853 | A | | 4/2010 | |
| JP | 2015065178 | A | * | 4/2015 | |
| JP | 2020125131 | A | | 8/2020 | |
| KR | 20010015414 | A | * | 2/2001 | |
| KR | 20110001447 | A | * | 1/2011 | |
| WO | 2011158878 | A1 | | 12/2011 | |

OTHER PUBLICATIONS

U.S. Appl. No. 17/561,878, filed Jul. 17, 2024_CN_109477817_ A_H.pdf Mar. 15, 2019.*
U.S. Appl. No. 17/561,878, filed Jul. 17, 2024_CN_111007408_A_ H.pdf Apr. 14, 2020.*
U.S. Appl. No. 17/561,878, filed Jul. 30, 2024_CN_101806569_ A_H.pdf Aug. 18, 2010.*
U.S. Appl. No. 17/561,878, filed Jul. 30, 2024_CN_116989720_A_ H.pdf, Nov. 3, 2023.*
U.S. Appl. No. 17/561,878, filed Jul. 30, 2024_JP_2004014791_ A_H.pdf, Jan. 15, 2004.*
U.S. Appl. No. 17/561,878, filed Jul. 30, 2024_JP_2005108801_ A_H.pdf, Apr. 21, 2005.*
U.S. Appl. No. 17/561,878, filed Jul. 30, 2024_JP_2008153119_ A_H.pdf, Jul. 3, 2008.*
U.S. Appl. No. 17/561,878, filed Jul. 30, 2024_KR_20110001447_ A_H.pdf, Jan. 6, 2011.*
U.S. Appl. No. 17/561,878, filed Jul. 31, 2024_CA_2860468_A1_ H.pdf, Jul. 11, 2013.*
U.S. Appl. No. 17/561,878, filed Jul. 31, 2024_CN_102637769_ A_H.pdf, Aug. 15, 2012.*
U.S. Appl. No. 17/561,878, filed Jul. 31, 2024_CN_105529501_ A_H.pdf, Apr. 27, 2016.*
U.S. Appl. No. 17/561,878, filed Jul. 31, 2024_JP_2007022651_ A_H.pdf, Feb. 1, 2007.*
U.S. Appl. No. 17/561,878, filed Jul. 31, 2024_JP_H05182649_A_ H.pdf, Jul. 23, 1993.*
U.S. Appl. No. 17/561,878, filed Jul. 30, 2024_JP_H0837317_A_ H.pdf, Feb. 6, 1996.*
U.S. Appl. No. 17/561,878, filed Jul. 31, 2024_KR_20010015414_ A_H.pdf, Feb. 26, 2001.*
U.S. Appl. No. 17/561,878, filed Jul. 31, 2024_JP_H08106885_A_ H.pdf, Apr. 23, 1996.*

* cited by examiner

INSPECTION DEVICE AND MANUFACTURING METHOD OF FILM-TYPE BATTERY

CROSS REFERENCE TO RELATED APPLICATIONS

The present application claims the priority based on Japanese Patent Application No. 2020-218814 filed on Dec. 28, 2020, the entire contents of which are incorporated by reference in the present specification.

BACKGROUND

The present disclosure relates to an inspection device and a manufacturing method of a film-type battery.

Conventionally, a film-type battery has been known which is hermetically sealed by accommodating an electrode body and an electrolyte in the inside of a film-shaped exterior member (which will be hereinafter referred to as a film exterior body), and heat sealing the periphery thereof. When such a film-type battery has a poorly hermetically sealed part, the electrolyte may be leaked. For this reason, generally, the air tightness is inspected before shipment. For example, WO 2011/158878 describes as follows: a film-type battery is placed in a hermetic container, and the rugged shapes of the surface of the film-type battery are compared between before and after reducing the pressure in the enclosed container, thereby inspecting the air tightness.

SUMMARY

According to the study by the present inventors, when poor heating, insufficient heating due to biting of foreign matters, or the like is caused during heat sealing, a partial loss (poorly sealed site) in the heat seal part such as partial narrowing of the seal width may be caused. For such a film-type battery, the poorly sealed site becomes more likely to be cleaved, such that the compressive strength may be insufficient in use. With the technology of WO 2011/158878, although the air tightness can be inspected, the poorly sealed site of the heat seal part cannot be detected. For this reason, the compressive strength of the film-type battery may vary.

The present disclosure was completed in view of such circumstances. It is an object of the present disclosure to provide an inspection device of a film-type battery which can detect the poorly sealed site of the heat seal part, and a method for manufacturing a film-type battery having stable compressive strength.

The present disclosure provides an inspection device of a film-type battery including an electrode body, and a film exterior body for accommodating the electrode body in an inside thereof, and including a heat seal part at a periphery thereof. Such an inspection device, includes: a temperature measuring device for measuring a temperature distribution of the heat seal part; and a first determination part for controlling the temperature measuring device in a prescribed time after formation of the heat seal part at the film exterior body, and determining presence or absence of a poorly sealed site based on the temperature distribution measured.

With the inspection device, the location of the poorly sealed site, namely, whether or not there is a partial loss such as a partial narrowing of the seal width can be detected with precision. As a result of this, it is possible to provide a film-type battery having stable compressive strength.

In accordance with a preferable aspect of the inspection device herein disclosed, the inspection device further includes: a thickness measuring device for measuring a thickness distribution of the heat seal part; and a second determination part for controlling the thickness measuring device after formation of the heat seal part at the film exterior body, and determining presence or absence of a poorly sealed site based on the thickness distribution measured. With the configuration, it is possible to three dimensionally confirm and more highly precisely detect the poorly sealed site of the heat seal part.

In accordance with another preferable aspect of the inspection device herein disclosed, the film-type battery includes: a terminal electrically connected at one end thereof with the electrode body in an inside of the film exterior body, and extended at the other end thereof to an outside of the film exterior body; and a sealant film provided on a surface of the terminal on a side thereof opposed to the film exterior body, and welded to the film exterior body. The heat seal part includes: a first seal part at which the film exterior body and the sealant film are heat sealed; and a second seal part at which the film exterior bodies are heat sealed. The first determination part is configured so as to determine the first seal part and the second seal part by different criteria of determination. The first seal part and the second seal part may vary in, for example, the heating set temperature of heat sealing, and the change in temperature (way of cooling) after heat sealing. For example, when the terminal is made of a metal, the first seal part can be a portion which is more likely to cool than the second seal part. By making the criteria of determination for the first seal part and the second seal part different from each other, it is possible to detect the poorly sealed site with precision.

In accordance with a still other aspect of the inspection device herein disclosed, the first determination part is configured so as to measure at least the temperature distribution of the first seal part. In the first seal part, the sealant film is interposed between the terminal and the film exterior body. As a result, poor sealing may become more likely to be caused as compared with the second seal part. However, with the foregoing configuration, it is possible to detect the poorly sealed site at the first seal part with precision.

In accordance with a furthermore preferable aspect of the inspection device herein disclosed, the first determination part is configured so as to acquire the temperature distribution after an elapse of a first time, and the temperature distribution after an elapse of a second time longer than the first time in the prescribed time, and to calculate a temperature change amount per unit time, thereby determining the presence or absence of the poorly sealed site based on the temperature change amount. By performing good/bad determination based on the temporal temperature change amount ($\Delta T$), it is possible to detect the poorly sealed site with high precision.

Further, the present disclosure provides a method for manufacturing a film-type battery, including a step of, using the inspection device disclosed herein, inspecting the heat seal part after forming the heat seal part.

With the manufacturing method, it is possible to manufacture a film-type battery excellent in air tightness and durability, and stable in compressive strength.

DETAILED DESCRIPTION

Below, appropriately referring to the accompanying drawings, preferable embodiments of the technology herein disclosed will be described. Furthermore, matters necessary for executing the present disclosure (e.g., a general configuration and a constructing process of a film-type battery), except for matters specifically referred to in the present specification (e.g., an inspection device and a manufacturing method of a film-type battery) can be grasped as design matters of those skilled in the art based on the related art in the present field. The technology herein disclosed can be executed based on the contents disclosed in the present specification, and the technical common sense in the present field. Further, in the following drawings, the members/parts producing the same action are given the same numeral and sign, and an overlapping description thereon may be omitted or simplified.

Furthermore, in the present specification, the term "film-type battery" denotes a battery configured such that an electrode body is accommodated in the inside of a film (sheet)-shaped exterior member in general. Further, in the present specification, the term "battery" is a term denoting an electric storage device capable of extracting the electric energy in general, and is a concept including a primary battery and a secondary battery. Further, in the present specification, the term "secondary battery" is a term denoting an electric storage device capable of repeatedly charging and discharging in general, and a concept including a so-called storage battery (chemical battery) such as a lithium secondary battery or a nickel hydrogen battery, and a capacitor (physical battery) such as an electric double layer capacitor.

Film-Type Battery 100

Figure 1:
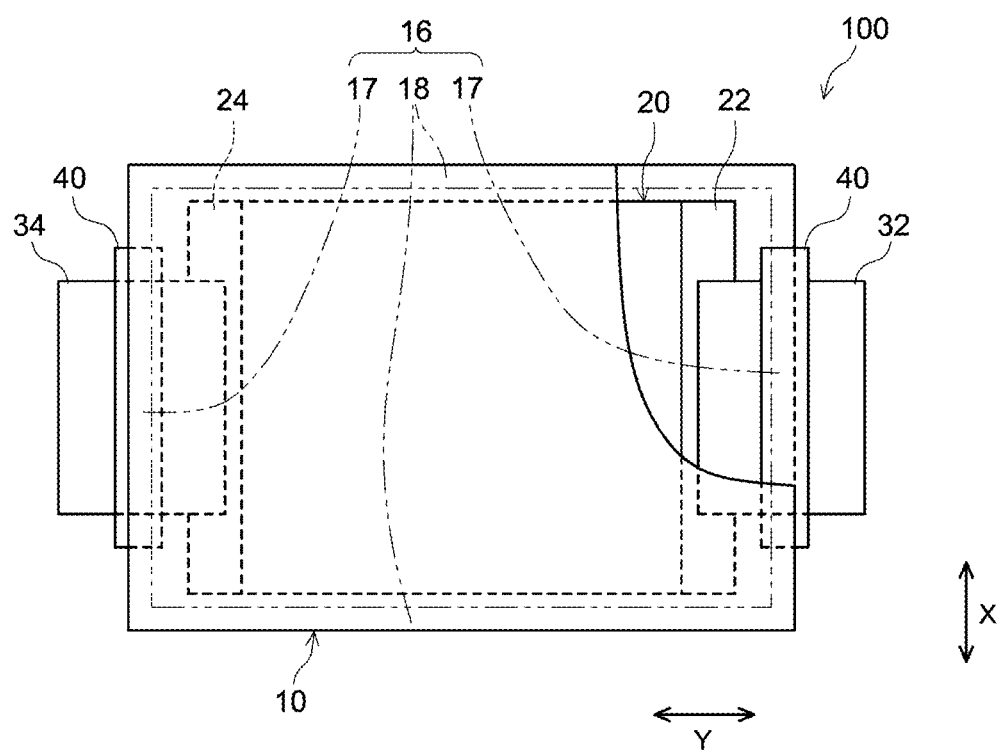
FIG. 1 is a partially broken plan view schematically showing a film-type battery in accordance with one embodiment.

First, a film-type battery 100 to be inspected will be described. FIG. 1 is a partially broken plan view schematically showing a film-type battery 100. The film-type battery 100 includes a film exterior body 10, an electrode body 20, a positive electrode terminal 32, a negative electrode terminal 34 and an electrolyte (not shown). The film-type battery 100 is herein a lithium ion secondary battery. The positive electrode terminal 32 and the negative electrode terminal 34 are each one example of the terminal. Furthermore, in the following description, reference signs X, Y, and Z in the drawings represent the short side direction, the long side direction orthogonal to the short side direction, and the thickness direction of the film-type battery 100, respectively. The long side direction is one example of the direction of extension of the positive electrode terminal 32 and the negative electrode terminal 34. However, these are merely the directions for convenience of description, and should not be construed as limiting the arrangement form of the film-type battery 100 at all.

The film exterior body 10 is a container for accommodating the electrode body 20 and the electrolyte in the inside thereof. For the film exterior body 10, herein, in order to enable heat sealing, at least the inner surface (the surface on the side thereof opposed to the electrode body 20) includes a resin layer. The resin layer includes, for example, a thermoplastic resin such as a polyolefine resin or a polyester resin. Examples of the polyolefine resin may include polyethylene (PE), polypropylene (PP), and acid modified polyolefine resins such as maleic anhydride modified polypropylene and maleic anhydride polyester. The film exterior body 10 is herein a so-called laminate film. The laminate film may be the same as that for use in, for example, a conventionally known laminate type battery, and has no particular restriction. The film exterior body 10 includes, for example, a first resin layer, a metal layer, and a second resin layer stacked in this order from the side closer to the electrode body 20.

The film exterior body 10 is herein formed in a bag shape by stacking two rectangular films one on another, and sealing the periphery thereof. As indicated with a dashed-and-double-dotted line in FIG. 1, a heat seal part 16 is formed at the periphery (herein, the four sides surrounding the electrode body 20) of the film exterior body 10. The heat seal part 16 seals the electrode body 20 and the electrolyte in the inside of the film exterior body 10 air-tightly.

The heat seal part 16 is herein formed in a ring shape along the outer edge of the film exterior body 10. The heat seal part 16 includes a first seal part 17 and a second seal part 18. The first seal part 17 is the site at which the film exterior body 10 and a sealant film 40 described later are heat sealed. The first seal parts 17 are herein formed at the opposite ends in the long side direction Y of the film exterior body 10 each in a band shape, respectively. Particularly, the first seal parts 17 are formed at the edge of the film exterior body 10 on the side thereof from which the positive electrode terminal 32 is extended (the right side in the long side direction Y), and the edge on the side thereof from which the negative electrode terminal 34 is extended (the left side in the long side direction Y), respectively. However, when the positive electrode terminal 32 and the negative electrode terminal 34 extend from one end in the long side direction Y together, the first seal part 17 may be formed only at the end on one side in the long side direction Y. The first seal part 17 is formed with a prescribed seal width (the vertical length from the inner edge to the outer edge).

The second seal part 18 is a portion of the heat seal part 16 except for the first seal part 17. The second seal part 18 is the site at which the opposing film exterior bodies 10 are heat sealed. The second seal parts 18 are herein formed at least at the opposite ends in the short side direction X of the film exterior body 10 each in a band shape, respectively. However, for example, when one film is folded in half for use, or a cylindrical film is used, the second seal part 18 is not required to be formed at one or both ends in the short side direction X. The second seal part 18 is formed with a prescribed seal width (the vertical length from the inner edge to the outer edge). The seal width of the second seal part 18 may be the same as, or may be different from that of the first seal part 17.

The configuration of the electrode body 20 may be the same as that of a conventionally known battery, and has no particular restriction. The electrode body 20 includes a sheet-shaped positive electrode (positive electrode sheet) and a sheet-shaped negative electrode (negative electrode sheet). As shown in FIG. 1, the electrode body 20 is herein a laminated electrode body including a quadrangular (typically, a rectangular) positive electrode sheet, and a quadrangular (typically, a rectangular) negative electrode sheet stacked one on another while being insulated from each other. However, the electrode body 20 may be, for example, a wound electrode body including a band-shaped positive electrode sheet and a band-shaped negative electrode sheet stacked one on another while being insulated from each other, and wound in the longitudinal direction. The positive electrode typically has a positive electrode collector, and a positive electrode active material layer (not shown) fixed onto the positive electrode collector, and including a positive electrode active material. The negative electrode typically has a negative electrode collector, and a negative electrode active material layer (not shown) fixed on the negative electrode collector, and including a negative electrode active material.

As shown in FIG. 1, the electrode body 20 has a portion (positive electrode collector exposed part) 22 at which the positive electrode active material layer is not formed at one end (the right end of FIG. 1) in the long side direction Y. The positive electrode collector exposed part 22 is joined with the positive electrode terminal 32. The electrode body 20 has a portion (negative electrode collector exposed part) 24 at which the negative electrode active material layer is not formed at the other end (the left end of FIG. 1) in the long side direction Y. In the long side direction Y, the negative electrode collector exposed part 24 is herein arranged on the side opposite to the positive electrode collector exposed part 22. The negative electrode collector exposed part 24 is joined with the negative electrode terminal 34.

The electrolyte may be the same as that of a conventionally known battery, and has no particular restriction. The electrolyte is, for example, a nonaqueous electrolyte including a nonaqueous type solvent and a support salt. The nonaqueous type solvent includes, for example, carbonates. The support salt is, for example, a fluorine-containing lithium salt such as lithium hexafluorophosphate ($LiPF_6$). However, the electrolyte may be in a solid state (solid electrolyte), and may be integrated with the electrode body 20.

The positive electrode terminal 32 is a sheet-shaped metal member. The positive electrode terminal 32 is arranged at one end (the right end of FIG. 1) in the long side direction Y. One end of the positive electrode terminal 32 is electrically connected with the positive electrode collector exposed part 22 in the inside of the film exterior body 10. The other end of the positive electrode terminal 32 is extended to the outside of the film exterior body 10.

As shown in FIG. 1, a sealant film 40 is integrated with a part of the surface of the positive electrode terminal 32 on the side thereof opposed to the film exterior body 10. The sealant film 40 is typically welded to the surface of the positive electrode terminal 32 on the side thereof opposed to the film exterior body 10. However, the sealant film 40 may be pasted to the positive electrode terminal 32 using adhesive or the like. The sealant film 40 is provided along the edge of the film exterior body 10 on the side thereof from which the positive electrode terminal 32 is extended (the right side of FIG. 1). The sealant film 40 extends in the short side direction X. One end of the sealant film 40 (the right end of FIG. 1) protrudes from the film exterior body 10.

The sealant film 40 covers the positive electrode terminal 32 so as to prevent the direct contact between the positive electrode collector exposed part 22 and the film exterior body 10. The sealant film 40 is welded (e.g., heat welded) to the film exterior body 10 opposed thereto. As a result of this, as shown in FIG. 1, at the edge of the film exterior body 10 on the side thereof from which the positive electrode terminal 32 is extended (the right side in the long side direction Y), the sealant film 40 is interposed between the positive electrode terminal 32 and the film exterior body 10, and a heat seal part 16 is formed.

The sealant film 40 typically includes a resin material. It is essential only that the sealant film 40 has a resistance to the electrolyte to be used, and includes a resin material which is molten at a temperature comparable to that of the resin layer (e.g., the first resin layer) of the film exterior body 10. It is essential only that the sealant film 40 exhibits preferable adhesion to both the film exterior body 10 and the positive electrode terminal 32. Examples of the resin material forming the sealant film 40 may include the thermoplastic resins exemplified as those capable of forming the resin layer of the film exterior body 10. The sealant film 40 may be a polyolefine film.

The negative electrode terminal 34 is a sheet-shaped metal member. The negative electrode terminal 34 is arranged at the other end (the left end of FIG. 1) in the long side direction Y. In the long side direction Y, the negative electrode terminal 34 is arranged on the opposite side to the positive electrode terminal 32. However, the positive electrode terminal 32 and the negative electrode terminal 34 may extend from the ends in the same direction of the film exterior body 10, for example, one end in the long side direction Y together. One end of the negative electrode terminal 34 is electrically connected with the negative electrode collector exposed part 24 in the inside of the film exterior body 10. The negative electrode terminal 34 extends along the long side direction Y. The other end of the negative electrode terminal 34 is extended to the outside of the film exterior body 10.

As shown in FIG. 1, the sealant film 40 is integrated with a part of the surface of the negative electrode terminal 34 on the side thereof opposed to the film exterior body 10 as with the positive electrode terminal 32. The sealant film 40 is welded (e.g., heat welded) with the film exterior body 10 opposed thereto. As a result of this, as shown in FIG. 1, at the edge of the film exterior body 10 on the side thereof from which the negative electrode terminal 34 is extended (the left side in the long side direction Y), the heat seal part 16 is formed with the sealant film 40 interposed between the negative electrode terminal 34 and the film exterior body 10.

Inspection Device 200

Figure 2:
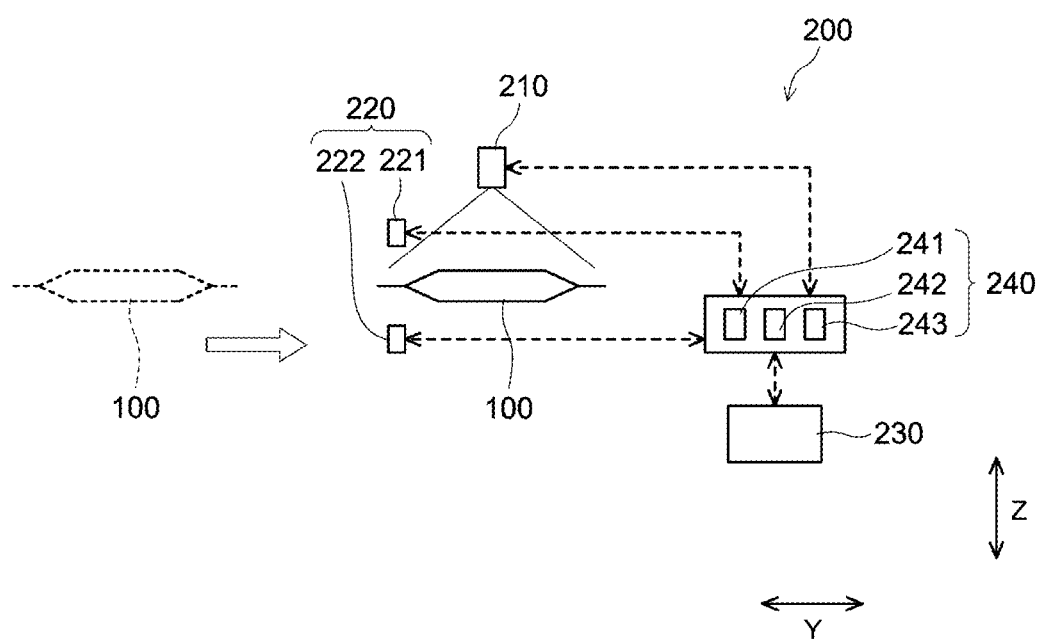
FIG. 2 is a schematic view showing a configuration of an inspection device in accordance with one embodiment.

Then, an inspection device 200 of the film-type battery 100 will be described. FIG. 2 is schematic view showing a configuration of the inspection device 200. The inspection device 200 is a device for detecting the poorly sealed site (partial loss) within a prescribed detection range of the heat seal part 16 for the film-type battery 100 after heat sealing. The inspection device 200 shown in FIG. 2 includes a temperature measuring device 210, a thickness measuring device 220, a display device 230, and a control device 240. However, in other embodiments, the thickness measuring device 220 and/or the display device 230 can be omitted. Below, respective constituent elements will be described.

The temperature measuring device 210 is a device for measuring the temperature distribution of the heat seal part 16. The temperature measuring device 210 is herein arranged above the film-type battery 100. The temperature measuring device 210 is, for example, a thermo camera for visualizing the distribution of the surface temperature of the film-type battery 100. The temperature measuring device 210 herein photographs the film-type battery 100 from above, and measures the temperature distribution of all the portions of the heat seal part 16. However, the photographed range of the heat seal part 16 may be only the first seal part 17 or the second seal part 18. The temperature measuring device 210 is preferably configured so as to be capable of measuring at least the temperature of the first seal part 17. The temperature measuring device 210 is electrically connected with the control device 240, and is controlled by the control device 240. The temperature distribution measured with the temperature measuring device 210 (typically, image data, for example, a thermography photographed by a thermo camera) is inputted to the control device 240.

The thickness measuring device 220 is a device for measuring the thickness distribution of the heat seal part 16. The thickness measuring device 220 is, for example, a non-contact type sensor. The thickness measuring device 220 is herein an optical length measuring sensor including a light emitting part 221 and a light receptive part 222 arranged opposed to each other in the thickness direction Z. A gap is created between the light emitting part 221 and the light receptive part 222 such that at least a part of the heat seal part 16 of the film-type battery 100 can be interposed therebetween. With the thickness measuring device 220, a light is applied from the light emitting part 221 toward the light receptive part 222. The light emitting part 221 is electrically connected with the control device 240, and is controlled by the control device 240. The value of the amount of light received is inputted from the light receptive part 222 to the control device 240, and is converted into the thickness.

The display device 230 is a device for displaying the information regarding the film-type battery 100 or the heat seal part 16. The display device 230 is, for example, a liquid crystal display or an organic EL display. The display device 230 may be configured so as to display whether the film-type battery 100 is a good product or a defective product. The display device 230 may also be configured so as to display the temperature distribution measured with the temperature measuring device 210 (e.g., a thermography photographed by a thermo camera) together with, for example, the temperature graph showing the correspondence between the color and the temperature. The display device 230 may be configured so as to display the thickness distribution measured by the thickness measuring device 220.

The control device 240 includes a first determination part 241, a second determination part 242, and a notification part 243. Furthermore, in other embodiments, the second determination part 242 and/or the notification part 243 can be omitted. The first determination part 241 is a control part for determining the presence or the absence of the poorly sealed site based on the temperature distribution of the heat seal part 16. The second determination part 242 is a control part for determining the presence or the absence of the poorly sealed site based on the thickness distribution of the heat seal part 16.

The notification part 243 is a control part for displaying whether the film-type battery 100 is a good product or a defective product on the display device 230 based on the determination results of the first determination part 241 and/or the second determination part 242. Particularly, the notification part 243 displays that the film-type battery 100 is a good product when there is no poorly sealed site, and displays that the film-type battery 100 is a defective product when there is a poorly sealed site. The notification part 243 may also be configured such that the determination results of the first determination part 241 and/or second determination part 242, and the obtained temperature distribution and/or the thickness distribution are displayed on the display device 230 as they are.

The control device 240 includes, for example, a CPU: central processing unit for executing the instruction of a control program, a ROM (read only memory) for storing the program to be executed by the CPU, a RAM (random access memory) to be used as a working area for developing a program, and a recording device such as a memory for storing the program and various data. Each part of the control device 240 may be formed of software, or may be formed of hardware. The control device 240 is connected to the temperature measuring device 210, the thickness measuring device 220, and the display device 230 communicably therewith, respectively, and is configured so as to control these.

Manufacturing Method of Film-Type Battery 100

Figure 3:
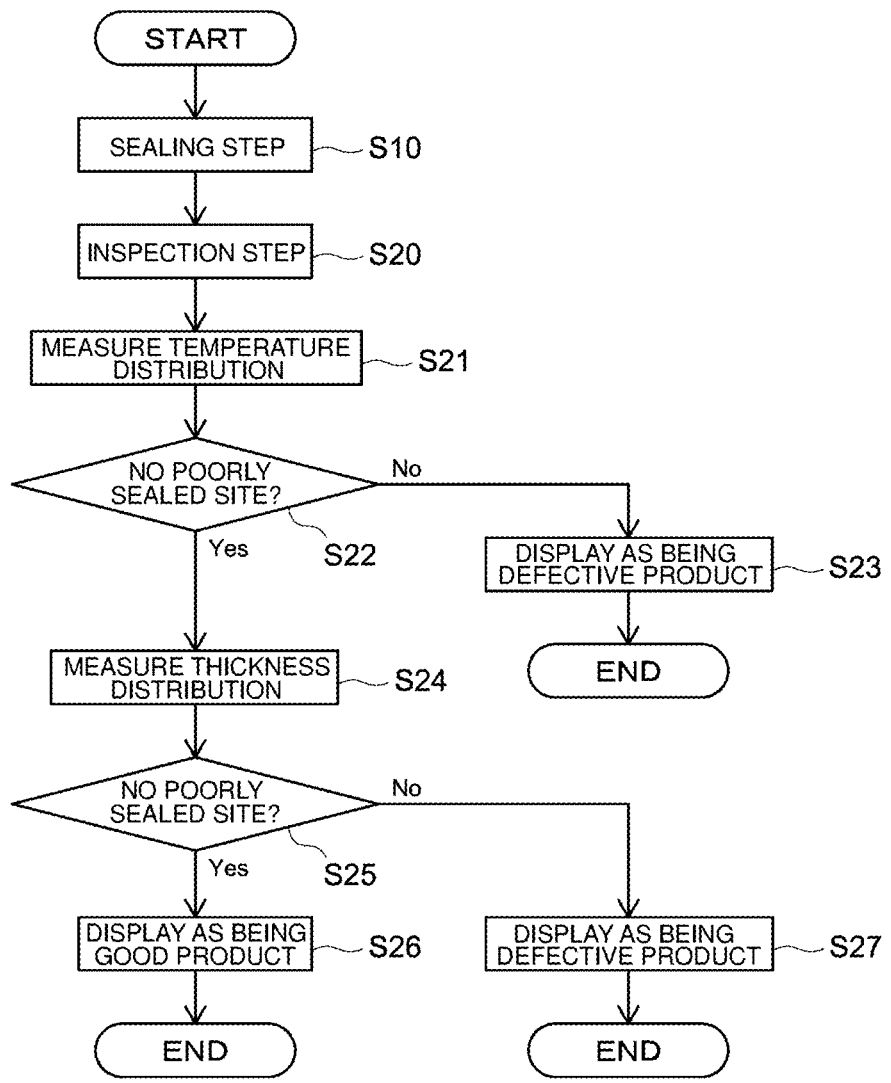
FIG. 3 is a flowchart showing a manufacturing method in accordance with one embodiment.

Then, the manufacturing method of the film-type battery 100 will be described. FIG. 3 is a flowchart showing one example of the manufacturing method. The manufacturing method of FIG. 3 includes a sealing step (Step S10), and an inspection step (Step S20). The inspection step (Step S20) is one example of the inspection method of the film-type battery 100 using the inspection device 200. The inspection step (Step S20) includes a temperature measuring step (Step S21), a first determination step (Step S22), a thickness measuring step (Step S24), a second determination step (Step S25), and display steps (Step S23, Step S26, and Step S27). However, in other embodiments, a part of these (e.g., Steps S24 and S25) can be omitted. Alternatively, the thickness measuring step and the second determination step can be performed before the temperature measuring step and the first determination step. Further, at a given stage, other processing can be included therein.

First, in Step S10, a heat seal part 16 (a first seal part 17 and a second seal part 18) is formed at the film exterior body 10. For example, an electrode body 20 impregnated with an electrolyte is sandwiched between a pair of laminate films, and the peripheries of the laminate films are heat sealed. Heat sealing can be performed by, for example, heat welding a resin layer using a heat bar heated to a prescribed working temperature. The working temperature may vary between the first seal part 17 and the second seal part 18. By heat sealing, the electrode body 20 is accommodated in the inside of the film exterior body 10, and the heat seal part 16 seals the film exterior body 10. Then, the process goes to Step S20.

furthermore, the operation from the sealing step (Step S10) to the inspection step (Step S20) may be performed manually, or may be performed by automatic control by the control device 240. In that case, for example, using a transport means such as a conventionally known transporting arm or transporting belt, for example, as indicated with an arrow in FIG. 2, the film-type battery 100 may only be transported to the vicinity of the inspection device 200.

Then, in Step S20, using the inspection device 200, the heat seal part 16 of the film-type battery 100 to be inspected is inspected. Particularly, first, in the temperature measuring step (Step S21), the first determination part 241 acquires the temperature distribution of the heat seal part 16. For example, when the present step is carried out by automatic control by the control device 240, the first determination part 241 controls the transport means, and moves the film-type battery 100 to immediately under the temperature measuring device 210. The first determination part 241 controls the temperature measuring device 210 in a prescribed time after the formation of the heat seal part 16 in Step S10, thereby acquiring the temperature distribution of the heat seal part 16 (specifically, the first seal part 17 and/or the second seal part 18). The prescribed time is the time during which the warmed condition of the heat seal part 16 is kept. The first determination part 241 herein drives the temperature measuring device 210 only one time in a prescribed time, thereby acquiring the temperature distribution of the heat seal part 16 after an elapse of a first time.

The temperature distribution is the data indicating the relationship between the position in a plan view and the measured temperature throughout the whole circumference of the heat seal part 16 formed in a ring shape. However, the data may be the data indicating the relationship between the position in a plan view and the measured temperature only for the first seal part 17 formed in a band shape, or may be the data indicating the relationship between the position in a plan view and the measured temperature only for the second seal part 18. The temperature distribution may be formed as, for example, the group of the set consisting of 3 values of the coordinates in the short side direction X, the coordinates in the long side direction Y, and the measured temperature for each photographed part obtained by dividing the photographed range at regular intervals in the short side direction X and the long side direction Y. Then, the process goes to Step S22.

Then, in the first determination step (Step S22), the first determination part 241 determines the presence or absence of a poorly sealed site based on the temperature distribution acquired in Step S21. The determination of the presence or absence of the poorly sealed site can be performed by, for example, comparing the measured temperature of each photographed part, and the temperature threshold value previously set as the criterion of determination. The temperature threshold value is set based on, for example, the heating set temperature of the heat bar for use in heat sealing, the elapsed time from Step S10, and the physical properties (e.g., the melt temperature of the resin layer) of the film exterior body 10 and/or the sealant film 40, and is stored in the first determination part 241. The temperature threshold value typically varies between the first seal part 17 and the second seal part 18. The temperature threshold value of the first seal part 17 may be set based on, for example, the welding temperature for the film exterior body 10 and the sealant film 40, and the materials for the positive electrode terminal 32 and/or the negative electrode terminal 34. The temperature threshold value of the second seal part 18 may be set based on, for example, the welding temperature for the film exterior bodies 10.

When poor heating, insufficient heating due to biting of foreign matters, or the like is caused in the heat seal part 16, the temperature of the heat seal part 16 is partially reduced. The first determination part 241 determines that there is no poorly sealed site (S22: YES) when all the measured temperatures of respective photographed parts are equal to, or higher than a temperature threshold value. The first determination part 241 herein determines that there is no poorly sealed site (S22: YES) when all the measured temperatures are equal to, or higher than a temperature threshold value in the data indicating the relationship between the positions and the measured temperatures throughout the whole circumference of the heat seal part 16. However, the first determination part 241 may determine that there is no poorly sealed site when all the measured temperatures are equal to, or higher than a temperature threshold value in the data indicating the relationship between the position and the measured temperature of the first seal part 17 or the second seal part 18, for example, in the case where the temperature distribution of only the first seal part 17 or the second seal part 18 is acquired in the temperature measuring step (Step S21). Then, the process goes to Step S24.

On the other hand, the first determination part 241 determines that there is a poorly sealed site (S22: NO) when the measured temperature is less than a temperature threshold value for at least one photographed part. The first determination part 241 herein determines that there is a poorly sealed site (S22: NO) when the measured temperature is less than a temperature threshold value even at one site in the data indicating the relationship between the positions and the measured temperatures throughout the whole circumference of the heat seal part 16. However, the first determination part 241 may determine that there is a poorly sealed site (S22: NO), when the measured temperature is less than a temperature threshold value even at one site in the data indicating the relationship between the position and the measured temperature of the first seal part 17 or the second seal part 18, for example, in the case where the temperature distribution of only the first seal part 17 or the second seal part 18 is acquired at the temperature measuring step (Step S21). Then, the process goes to Step S23. At the display step (Step S23), the notification part 243 displays that the film-type battery 100 to be inspected is a defective product on the display device 230. Then, the control is terminated.

Then, at the thickness measuring step (Step S24), the second determination part 242 acquires the thickness distribution of the heat seal part 16 (specifically, the first seal part 17 and/or the second seal part 18). For example, when the present step is carried out by automatic control by the control device 240, the second determination part 242 moves the film-type battery 100 within a prescribed measurement range, and controls the thickness measuring device 220, thereby allowing the light emitting part 221 to emit a light, and receiving the value of the amount of light received from the light receptive part 222. At the second determination part 242, the thickness distribution is generated based on the amount of light received. The thickness distribution is, for example, the data indicating the relationship between the positions in a plan view and the measured thicknesses throughout the whole circumference of the heat seal part 16 formed in a ring. However, the data may be the data indicating the relationship between the positions in a plan view and the measured thicknesses only for the first seal part 17 formed in a band, or may be the data indicating the relationship between the positions in a plan view and the measured thicknesses only for the second seal part 18. The thickness distribution may by formed as, for example, the group including the coordinates in the short side direction X and/or the long side direction Y within the measurement range, and the measured thicknesses associated with each other. Then, the process goes to Step S25.

Then, at the second determination step (Step S25), the second determination part 242 determines the presence or absence of a poorly sealed site based on the thickness distribution acquired at Step S24. The determination of the presence or absence of the poorly sealed site can be performed by, for example, comparing the measured thickness and the standard thickness range previously set as the criterion of determination. The standard thickness range is set based on, for example, the thicknesses of the film exterior body 10, the sealant film 40, and the positive electrode terminal 32 and/or the negative electrode terminal 34, and the like, and is stored in the second determination part 242. The standard thickness range typically varies between the first seal part 17 and the second seal part 18.

For example, when the film exterior body 10 has creases, or the sealant film 40 is twisted upon heat sealing, the thickness of the heat seal part 16 partially decreases or increases. The second determination part 242 determines that there is no poorly sealed site (S25: YES) when all the measured thicknesses fall within the standard thickness range. The second determination part 242 determines that there is no poorly sealed site (S25: YES), for example, when in the data indicating the relationship between the positions and the measured thicknesses throughout the whole circumference of the heat seal part 16, all the measured thicknesses fall within the standard thickness range. However, the second determination part 242 may determine that there is no poorly sealed site (S25: YES) when in the data indicating the relationship between the positions and the measured thicknesses of the first seal part 17 or the second seal part 18, all the measured thicknesses fall within the standard thickness range, for example, in the case where the thickness distribution of only the first seal part 17 or the second seal part 18 is acquired at the thickness measuring step (Step S24). Then, the process goes to Step S26. At the display step (Step S26), the notification part 243 displays that the film-type battery 100 to be inspected is a good product on the display device 230. Then, the control is terminated.

On the other hand, the second determination part 242 determines that there is a poorly sealed site (S25: NO) when the measured thickness at least one site falls outside the standard thickness range. The second determination part 242 determines that there is a poorly sealed site (S25: NO), for example, when the measured thickness at least one site falls outside the standard thickness range in the data indicating the relationship between the positions and the measured thicknesses throughout the whole circumference of the heat seal part 16. However, the second determination part 242 may determine that there is a poorly sealed site (S25: NO) when the measured thickness at even one site falls outside the standard thickness range in the data indicating the relationship between the position and the measured thickness of the first seal part 17 or the second seal part 18, for example, in the case where the thickness distribution of only the first seal part 17 or the second seal part 18 is acquired at the thickness measuring step (Step S24). Then, the process goes to Step S27. At the display step (Step S27), the notification part 243 displays that the film-type battery 100 to be inspected is a defective product on the display device 230. Then, the control is terminated.

As described up to this point, with the inspection device 200, it is possible to detect the presence or absence of the poorly sealed site of the heat seal part 16 with precision. Further, with the foregoing manufacturing method, it is possible to manufacture a film-type battery 100 having stable compressive strength.

Up to this point, specific examples of the present disclosure have been described in details. However, these are merely illustrative, and should not be construed as limiting the scope of the appended claims. The technology described in the appended claims includes various modifications and changes of the specific examples exemplified up to this point.

In the foregoing embodiments, the first determination part 241 is configured so as to drive the temperature measuring device 210 only one time in a prescribed time, and to acquire the temperature distribution after an elapse of the first time. However, the present disclosure is not limited thereto. The first determination part 241 may drive the temperature measuring device 210 two or more time in a prescribed time, thereby photographing the transient change in temperature over a plurality of times. The first determination part 241 may acquire the temperature distribution after an elapse of a first time, and the temperature distribution after an elapse of a second time longer than the first time in a prescribed time. In that case, the first determination part 241 may take a temporal difference from the comparison between the temperature distribution after an elapse of the second time and the temperature distribution after an elapse of the first time for each photographed part, thereby calculating the temperature change amount per unit time ($\Delta T$), and generating the distribution of the temperature change amount. At the first determination part 241, the determination of the presence or absence of a poorly sealed site may be performed by comparing the temperature change amount and the temperature change amount threshold value previously set as the criterion of determination for each photographed part.

The invention claimed is:

1. An inspection device for a film-type battery including an electrode body, and a film exterior body for accommodating the electrode body in an inside thereof, and including a heat seal part at a periphery thereof, the inspection device, comprising:
    a temperature measuring device for measuring a temperature distribution of the heat seal part; and
    a first determination part for controlling the temperature measuring device in a prescribed time after formation of the heat seal part at the film exterior body, and determining presence or absence of a poorly sealed site based on the temperature distribution measured, wherein:
    the first determination part is configured so as to acquire the temperature distribution after an elapse of a first time, and the temperature distribution after an elapse of a second time longer than the first time in the prescribed time, and to calculate a temperature change amount per unit time, thereby determining the presence or absence of the poorly sealed site based on the temperature change amount.

2. The inspection device according to claim 1, further comprising:
    a thickness measuring device for measuring a thickness distribution of the heat seal part; and
    a second determination part for controlling the thickness measuring device after formation of the heat seal part at the film exterior body, and determining presence or absence of the poorly sealed site based on the thickness distribution measured.

3. The inspection device according to claim 1, wherein:
    the film-type battery comprises:
        a terminal electrically connected at one end thereof with the electrode body in an inside of the film exterior body, and extended at the other end thereof to an outside of the film exterior body; and
        a sealant film provided on a surface of the terminal on a side thereof opposed to the film exterior body, and welded to the film exterior body,
    the heat seal part includes:
        a first seal part at which the film exterior body and the sealant film are heat sealed; and
        a second seal part at which opposing films of the film exterior body are heat sealed, and
    the first determination part is configured so as to determine the first seal part and the second seal part by different criteria of determination.

4. The inspection device according to claim 3, wherein:
    the first determination part is configured so as to measure at least the temperature distribution of the first seal part.

5. A method for manufacturing a film-type battery including an electrode body, and a film exterior body for accommodating the electrode body in an inside thereof, and including a heat seal part at a periphery thereof, the method comprising:
    after forming the heat seal part, inspecting the heat seal part using an inspection device, wherein
    the inspection device comprises:
        a temperature measuring device for measuring a temperature distribution of the heat seal part; and
        a first determination part for controlling the temperature measuring device in a prescribed time after formation of the heat seal part at the film exterior body, and determining presence or absence of a poorly sealed site based on the temperature distribution measured, and the first determination part is configured so as to acquire the temperature distribution after an elapse of a first time, and the temperature distribution after an elapse of a second time longer than the first time in the prescribed time, and to calculate a temperature change amount per unit time, thereby determining the presence or absence of the poorly sealed site based on the temperature change amount.

* * * * *